United States Patent [19]
Marschak

[11] 3,749,343
[45] July 31, 1973

[54] MEANS FOR CONNECTING ADJACENT RAILINGS TO A POST TO FORM A SUPPORT FOR FORMING A BOOKCASE, SHELVING, OR THE LIKE

[76] Inventor: Howard J. Marschak, 865 W. North Ave., Evanston, Ill.

[22] Filed: Oct. 15, 1971

[21] Appl. No.: 189,534

[52] U.S. Cl.............. 248/188, 108/111, 211/134, 287/54 B, 287/189.36 H
[51] Int. Cl............................................ F16m 11/16
[58] Field of Search.................... 248/188, 250; 108/153, 111, 155, 109; 211/134, 148, 182, 183; 287/189.36 H, 54 B

[56] References Cited
UNITED STATES PATENTS

| 1,952,111 | 3/1934 | Bales | 108/111 |
| 2,969,882 | 1/1961 | Hamilton | 108/111 |
| 3,187,693 | 6/1965 | Hamilton | 248/188 |
| 3,409,258 | 11/1968 | Carlson | 248/188 |
| 3,420,484 | 1/1969 | Mattick | 248/188 |
| 3,590,753 | 7/1971 | Blink et al. | 248/188 |
| 3,677,933 | 7/1972 | Collins | 287/289.36 H |

FOREIGN PATENTS OR APPLICATIONS

| 1,184,688 | 2/1959 | France | 287/54 B |

Primary Examiner—Marion Parsons, Jr.
Attorney—Max R. Kraus

[57] ABSTRACT

Means for connecting adjacent railings to tubular posts to form supports for shelving or the like, which includes corner brackets, each bracket having an intermediate curvilinear or arcuate-shaped section and oppositely extending ends, which ends are positioned at substantially right angles to each other and with side and end railings secured to the ends of the corner brackets and with the curvilinear section of the corner brackets positioned adjacent the tubular post and connected thereto.

6 Claims, 8 Drawing Figures

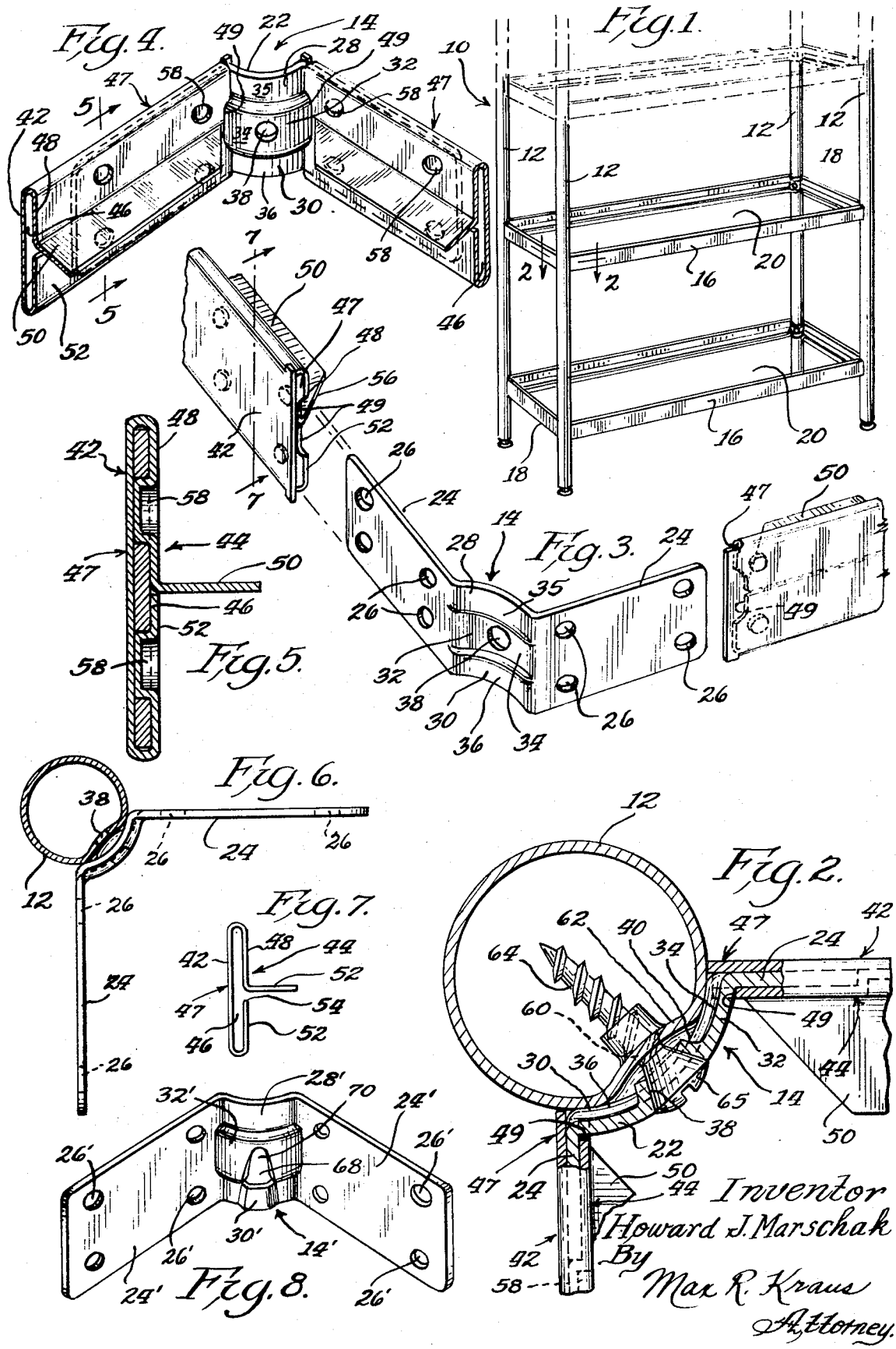

MEANS FOR CONNECTING ADJACENT RAILINGS TO A POST TO FORM A SUPPORT FOR FORMING A BOOKCASE, SHELVING, OR THE LIKE

BRIEF SUMMARY OF THE INVENTION

An object of this invention is to provide means for connecting adjacent railings to posts to form a support for forming a bookcase or shelving supports, or the like.

Another object of this invention is to provide means whereby the components for forming a bookcase may be shipped disassembled in a knockdown condition and the consumer may readily assemble same.

Another object of this invention is to provide an improved corner bracket having ends which fit within sleeves formed in the ends of the railings and interlock therewith to provide a framework for supporting a shelf or the like, and in which the corner bracket is secured to a tubular post, said bracket and post being so constructed that rocking therebetween is eliminated.

BRIEF DESCRIPTION OF THE DRAWINGS

In the drawings:

FIG. 1 is a view of a bookcase or the like formed with this invention.

FIG. 2 is an enlarged sectional view taken on line 2—2 of FIG. 1.

FIG. 3 is an exploded view of the bracket with a fragmentary view of the ends of the railings which are to be attached to the bracket.

FIG. 4 is a view taken from the opposite side of FIG. 3 and showing the bracket in assembled relation to the railings.

FIG. 5 is an enlarged sectional view taken on line 5—5 of FIG. 4.

FIG. 6 is a top plan view of the bracket in relation to the tubular post.

FIG. 7 is an elevational view taken on line 7—7 of FIG. 3, and

FIG. 8 is a view of a modified bracket.

The invention is shown in connection with a bookcase, generally indicated at 10, comprising four spaced corner tubular uprights or posts 12 which are connected by the corner brackets, generally indicated at 14, to the side and end railings, generally indicated at 16 and 18, which form supports for shelf members generally indicated at 20. The uprights or posts 12 may each be formed of a plurality of sections which are telescopically connected at their ends to each other to form a single post. This permits the posts to be assembled by the consumer and thereby reduces the overall size of the shipping carton.

The invention herein resides principally in the construction of the corner brackets 14 and the side and end railings 16 and 18 and the means for connecting the corner brackets to the side and end railings and to the tubular posts 12, whereby a bookcase, shelving, or the like, may be formed.

The corner brackets 14, one of which is secured to each of the posts 12 to form with the side and end railings a single shelf support comprises, an intermediate arcuate-shaped or curvilinear portion 22 and oppositely extending end portions 24, which end portions extend in planes at substantially right angles to each other. The end portions 24 are each provided with spaced openings 26. The intermediate arcuate or curvilinear portion is shaped to provide upper and lower curvilinear or arcuate sections 28 and 30, with a central outwardly raised or embossed section 32 concentric with the upper and lower sections 28 and 30. The interior surface 34 of the embossed portion 32 is offset outwardly from the interior surfaces 35 and 36 respectively, of the upper and lower sections 28 and 30.

The central embossed section 32 is provided with a central opening 38 which is punched therein, with the metal formed by the punching extending inwardly as at 40 surrounding or adjacent the central opening 38, as best seen in FIG. 2. The opposite end sections 24 are substantially flat. The entire corner bracket is an integrally formed member of metal or the like.

The side and end railings 16 and 18 are of identical constructure except for the difference in length. The longer railings 16 form the sides while the shorter railings 18 form the ends. The description of one of the railings will suffice for both. The railings (16 and 18) may be formed of metal or plastic or may be extruded. They are shaped to form a vertical outer wall 42 and a vertical inner wall 44 spaced as at 46 from the outer wall 42. The spaced vertical outer and inner walls 42 and 44 respectively at the opposite ends of the railings form a vertical sleeve 47 at the opposite ends of the railings to receive the flat ends 24 of the corner bracket 14 so that the bracket ends 24 may be secured to the railings.

The spaced inner wall 44 of the railings extends inwardly and downwardly, as at 48, from the outer wall 42 and then extends outwardly at its lower end at right angles to form a continuous ledge or lip 50. The lower upwardly extending portion 52 of the inner wall terminates as at 54 adjacent the ledge 50. As shown in the drawings, the upper and lower portions 48 and 52 of the inner wall 44 of the railing are split from each other along the length of the railing. This facilitates the insertion of the opposite ends 24 of the bracket 14 into the sleeves 47 of the railing. However, if the railings are extruded, the inner wall could be formed without the split shown. The opposite ends of the ledge 50 are cut or inclined at a 45° angle as at 56 so as not to interfere with the curvilinear portion of the corner bracket when connected to the corner bracket. Also, the ends or edges 49 of the inner wall 44 of the railing are contoured complementary to the shape of the arcuate portion 22 of the bracket against which the edges abut, as best shown in FIG. 4.

After the opposite ends 24 of the corner bracket 14 are inserted into the end sleeves 47 of the railings, the inner walls 44 of the railings coinciding with the position of the openings 26 in the corner brackets are pressed inwardly to form dimples or projections or embossings 58 which extend into the openings 26 to lock the railings to the corner brackets. Thus, a shelf supporting framework of rectangular shape is formed for each shelf desired and same is then ready to be secured to the tubular posts 12. This shelf supporting framework with the railings interlocked with the corner brackets is assembled at the factory and the assembled framework is packed as a unit and is ready for use to be connected to the posts by the ultimate consumer.

The tubular post 12 is punched to provide an opening 60 at the places where the corner brackets 14 are to be secured. In punching to form the opening 60, the material of the tube immediately adjacent and surrounding the opening will become distorted and somewhat flattened, as indicated at 62 in FIG. 2, so that it does not have the identical radius of the tube at such distorted area nor is it concentric with the tube. Thus, if a corner bracket 14 without an outwardly extending offset portion 32 were positioned against the flattened surface 62 of the tube, the corner bracket would rock relative to the post and an effective locking would not be obtainable. By providing the curvilinear portion of the corner bracket with spaced upper and lower portions 28 and 30 which have substantially the same radius as the tube 12, the upper and lower portions 28 and 30 firmly abut against the tube or post 12, whereas the offset or embossed portion 32 which would be positioned adjacent the distorted area of the tube is offset from the tube, thus, the rocking bwteween the corner bracket 14 and the tube 12 is prevented. A fastening screw 64 secures the corner bracket 14 to the post 12 through the alined openings 38 and 60. The head 65 of the screw countersinks into the opening 38 and the threads engage the opening 60 in the tube to lock thereto.

The ledges 50 form a support on which a shelf 20 is supported. The outer edges of the shelf 20 will abut against the inner walls 44 of the railings to protect same, as well as maintain the shelf 20 within the boundary formed by the side and end railings. Any number of such shelf supports may be provided. While three such shelves are shown in FIG. 1, a bookcase of any desired height with any number of similarly arranged shelves may be formed with this invention.

FIG. 8 MODIFICATION

FIG. 8 shows a modification in the corner bracket which has been identified by the numeral 14' and is similar to corner bracket 14 except that in the centrally outwardly raised or embossed section 32' there is provided a keyhole slot 68 in lieu of the opening 38. The keyhole slot 68 is widest at the bottom and narrows as at 70 adjacent the top of the slot. A portion of the slot 68 may extend into the lower arcuate section 30'. The other elements, not herein described, are similar to those previously described and bear the same numerals primed. The keyhole slot 68 permits the post 12 to have the fastening screw 64 put in at the point of manufacture so that in the assembly of same the consumer merely slips the corner bracket 14' downwardly on the fastening screw 64 through the keyhole slot 68, which thereby locks the corner bracket to the post. Or in lieu of a fastening screw, the post 12 may be provided with a headed stud brazed thereto so that the keyhole slot 68 can be slipped on the headed stud and retained thereby.

What is claimed is:

1. Means for connecting adjacent railings to a vertical tubular metal post for forming sides and ends at substantially right angles to each other to form a unit for supporting shelves, said means comprising a corner bracket having an intermediate portion and oppositely extending end portions extending from said intermediate portion, with said intermediate portion being of a generally arcuate or curvilinear shape and the oppositely extending end portions positioned approximately at right angles to each other, each of the opposite ends of the corner bracket being secured to a railing, said intermediate arcuate portion having spaced upper and lower portions contacting said vertical tubular post with an intermediate portion between the spaced upper and lower portions embossed to be spaced from contact with said vertical tubular metal post, said last mentioned intermediate embossed portion having an opening to receive a fastening member to secure said corner bracket to said vertical tubular post, with the material around said opening extending inwardly, said vertical tubular metal post having an opening to receive said fastening member, with the metal adjacent said last mentioned opening being flattened and with said flattened portion positioned adjacent said intermediate embossed portion.

2. A structure as set forth in claim 1 in which the railings have each of their opposite ends shaped to form a sleeve to receive the end portions of the corner bracket to secure the railings to the corner bracket.

3. A structure as set forth in claim 2 in which the railings have ledges extending horizontally on which a shelf is supported.

4. A structure as set forth in claim 1 in which the opening in the intermediate portion of the corner bracket is generally of a keyhole shape whereby it may be slipped on to the fastening member already on said post to secure the corner bracket to the post.

5. A structure as set forth in claim 1 in which the fastening member has a threaded end engaging the openings, with said fastening member being secured through said threaded engagement.

6. Means for connecting adjacent railings to a vertical cylindrical-shaped tubular metal post for forming sides and ends at substantially right angles to each other to form a unit for supporting shelves, said means comprising a corner bracket having an intermediate portion and oppositely extending end portions extending from said intermediate portion, with said intermediate portion being of a generally arcuate or curvilinear shape and the oppositely extending end portions positioned approximately at right angles to each other, each of the opposite ends of the corner bracket being secured to a railing, said intermediate arcuate portion having spaced upper and lower portions of the same radius as the cylindrical post and contacting said cylindrical post with an intermediate offset portion between the spaced upper and lower portions and concentric therewith and spaced from contact with said cylindrical post, said intermediate offset portion having an opening to receive a threaded fastening member, said cylindrical post having an opening to receive and be directly engaged by the threaded end of said threaded fastening member for securing said bracket to said post by the threaded engagement of said fastening member, said railings having sleeve-shaped ends adapted to be slipped on the opposite ends of said bracket for securing said sleeved ends to said bracket to support said railings, said railings having an inwardly extending ledge for supporting a shelf.

* * * * *